United States Patent
Zou et al.

(10) Patent No.: US 11,536,864 B1
(45) Date of Patent: Dec. 27, 2022

(54) METHOD FOR ESTABLISHING GEOSTRESS FIELD DISTRIBUTION OF SLOPES IN A CANYON AREA

(71) Applicant: INSTITUTE OF GEOLOGY AND GEOPHYSICS, CHINESE ACADEMY OF SCIENCES, Beijing (CN)

(72) Inventors: Yu Zou, Beijing (CN); Songfeng Guo, Beijing (CN); Shengwen Qi, Beijing (CN); Xiaolin Huang, Beijing (CN); Bowen Zheng, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/855,697

(22) Filed: Jun. 30, 2022

(30) Foreign Application Priority Data

Jul. 22, 2021 (CN) .......................... 202110828137.6

(51) Int. Cl.
*G01V 1/30* (2006.01)
*G01V 99/00* (2009.01)

(52) U.S. Cl.
CPC ............ *G01V 1/306* (2013.01); *G01V 99/005* (2013.01)

(58) Field of Classification Search
None
See application file for complete search history.

(56) References Cited

U.S. PATENT DOCUMENTS

2011/0182144 A1* 7/2011 Gray .................. G01V 1/30
367/75

OTHER PUBLICATIONS

Stead, Doug & Eberhardt, Erik. (2013). Understanding the mechanics of large landslides. Ital. J. Eng. Geol. Environ. Book Ser. 6. 85-112 (Year: 2013).*
Wu, L., Liu, D. & Cao, P. A new method for evaluating rock mass quality of slopes based on interval continuous mathematical models. Bull Eng Geol Environ 79, 1357-1364 (2020). https://doi.org/10.1007/s10064-019-01661-5 (Year: 2020).*

(Continued)

*Primary Examiner* — Lina M Cordero
(74) *Attorney, Agent, or Firm* — Hemisphere Law, PLLC; Zhigang Ma

(57) ABSTRACT

A method for establishing a geostress field distribution of slopes in canyon areas includes: obtaining a persistence ratio of a fracture surface based on a structural plane trace length and a rock bridge length of the fracture surface, and then obtaining a fracture stage of a crack according to progressive failure characteristics of rock mass, combining a character of the fracture surface to obtain magnitude and direction of a maximum principal stress, and establishing the geostress field distribution. The method is simple to operate, does not need to carry out geostress testing, does not need a large amount of manpower and material resources, does not need redundant fund investment, and can simply and effectively obtain geostress field data. Moreover, combining with the geostress field inversion technology, a large-scale geostress field distribution condition can be obtained, which can provide a basis for engineering site selection and engineering rock mass stability determination.

6 Claims, 2 Drawing Sheets

(56) References Cited

OTHER PUBLICATIONS

Wu Faquan et al., "Statistical Mechanics on the Structure Effects of Rock Masses", Journal of Engineering Geology, Dec. 31, 2014, pp. 601-609, vol. 22, No. 4.
Lv Xiao-bo et al., "Failure process of rock with single precast crack based on ratio of concentration stress to peak stress", Rock and Soil Mechanics, Jun. 30, 2017, pp. 87094, vol. 38.
CNIPA, Notification of a First Office Action for CN202110828137.6, dated Aug. 30, 2021.
Institute of Geology and Geophysics, Chinese Academy of Sciences (Applicant), Reply to Notification of a First Office Action for CN202110828137.6, w/ allowed replacement claims, dated Sep. 2, 2021.
CNIPA, Notification to grant patent right for invention in CN202110828137.6, dated Sep. 15, 2021.

\* cited by examiner

METHOD FOR ESTABLISHING GEOSTRESS FIELD DISTRIBUTION OF SLOPES IN A CANYON AREA

TECHNICAL FIELD

The invention relates to the field of geological prospecting in canyon areas, in particular to a method for establishing a geostress field distribution of slopes in a canyon area.

BACKGROUND

Geostress is one of important occurrence environments for geological bodies. Phenomena such as landslides, tunnel slope deformation and damage, and fault activities are mechanical behaviors of geological bodies with certain deformation strength characteristics under the action of geostress. In the engineering geological fieldwork, it is very important to determine a magnitude of the geostress in the geological body, and the stability of rock-soil mass under natural conditions or after engineering disturbance can be estimated according to the geostress.

At present, the geostress is mainly obtained by geostress testing methods such as a stress relief method, a stress recovery method and a hydraulic fracturing method, but these methods require specialized equipment and are time-consuming and laborious. Therefore, there is a need of a method that can quickly estimate the geostress in engineering geological investigations.

SUMMARY

The invention is to provide a method for establishing a geostress field distribution of slopes in a canyon area, which can obtain a maximum principal stress of a rock on a fracture surface according to a structural plane trace length and a rock bridge of the fracture surface and then combine an occurrence of structural plane to establish a linear coefficient relationship between principal stress and occurrence, and afterwards the stress field distribution in the canyon area can be established through stress field inversion.

In order to achieve the above objective, the invention proposes technical solutions as follows.

Specifically, a method for establishing a geostress field distribution of slopes in a canyon area may include the following steps:

acquiring a structural plane trace length, a rock bridge length, an occurrence, and a character of a fracture surface, and obtaining a persistence ratio of the fracture surface based on the structural plane trace length and the rock bridge length;

obtaining, based on a correspondence of persistence ratios of fracture surface with preset fracture stages of crack, a fracture stage of a crack corresponding to the persistence ratio of the fracture surface;

obtaining a magnitude of a maximum principal stress of the crack based on the fracture stage and the character, and obtaining a direction of the maximum principal stress of the crack based on the occurrence; and establishing the geostress field distribution of the slopes in the canyon area based on the magnitude of the maximum principal stress and the direction of the maximum principal stress.

In a preferred embodiment, the structural plane trace length and the occurrence are acquired through a precise survey line method for structural plane measurement.

In a preferred embodiment, obtaining the persistence ratio of the fracture surface includes: obtaining a sum of the rock bridge length of the fracture surface and the structural plane trace length; and dividing the structural plane trace length by the sum of the rock bridge length and the structural plane trace length as the persistence ratio of the fracture surface.

In a preferred embodiment, the character includes a property and a weathering degree of a rock.

In a preferred embodiment, the obtaining a magnitude of a maximum principal stress includes: obtaining a peak strength of the rock based on the property and the weathering degree of the rock; and obtaining the magnitude of the maximum principal stress based on the peak strength and the fracture stage.

In a preferred embodiment, the direction of the maximum principal stress is parallel to the fracture surface.

In a preferred embodiment, the establishing the geostress field distribution of the slopes in the canyon area includes: based on the magnitude of the maximum principal stress and the direction of the maximum principal stress, using a multivariate regression principle and changing independent variables of rock mass to establish a linear coefficient relationship, and then establishing the geostress field distribution of the slopes in the canyon area. The independent variables of rock mass include a deformation modulus of rock mass and a geological structure variable.

In a preferred embodiment, the geostress field distribution of the slopes in the canyon area is established through stress field inversion and least square coefficient regression based on the linear coefficient relationship.

The invention may achieve the following beneficial effects.

The invention provides a method for establishing a geostress field distribution of slopes in a canyon area, which may obtain a maximum principal stress of a rock on a fracture surface by using a structural plane trace length and a rock bridge of the fracture surface, and combine the occurrence of structural plane to establish a linear coefficient relationship between the principal stress and the occurrence, and then establish the stress field distribution in the canyon area through stress field inversion. Compared with the related art, the method is simple to operate, does not need to carry out geostress testing, does not need a large amount of manpower and material resources, does not need redundant fund investment, and can simply and effectively obtain geostress field data. Moreover, combining with the geostress field inversion technology, a large-scale geostress field distribution condition can be obtained, which can provide a basis for engineering site selection and engineering rock mass stability determination; in other words, the method may further include a step of applying the geostress field distribution in the canyon area in engineering site selection and engineering rock mass stability determination.

BRIEF DESCRIPTION OF DRAWINGS

In order to explain technical solutions of the invention more clearly, drawings used in embodiments of the invention will be briefly introduced below. Apparently, the drawings described below are only some embodiments of the invention. For those skilled in the art, other drawings can be obtained according to these illustrated drawings without creative work.

DETAILED DESCRIPTION OF EMBODIMENTS

The technical solutions in embodiments of the invention will be clearly and completely illustrated below in combination with the accompanying drawings in the embodiments of the invention. Apparently, the illustrated embodiments are only some of embodiments of the invention, rather than all of embodiments of the invention. Based on the illustrated embodiments of the invention, all other embodiments obtained by those skilled in the art without creative work should belong to the protection scope of the invention.

In order to make the above objectives, features and advantages of the invention clearer and easy to understand, the invention will be described in further detail below in combination with the accompanying drawings and specific embodiments.

Figure 1:
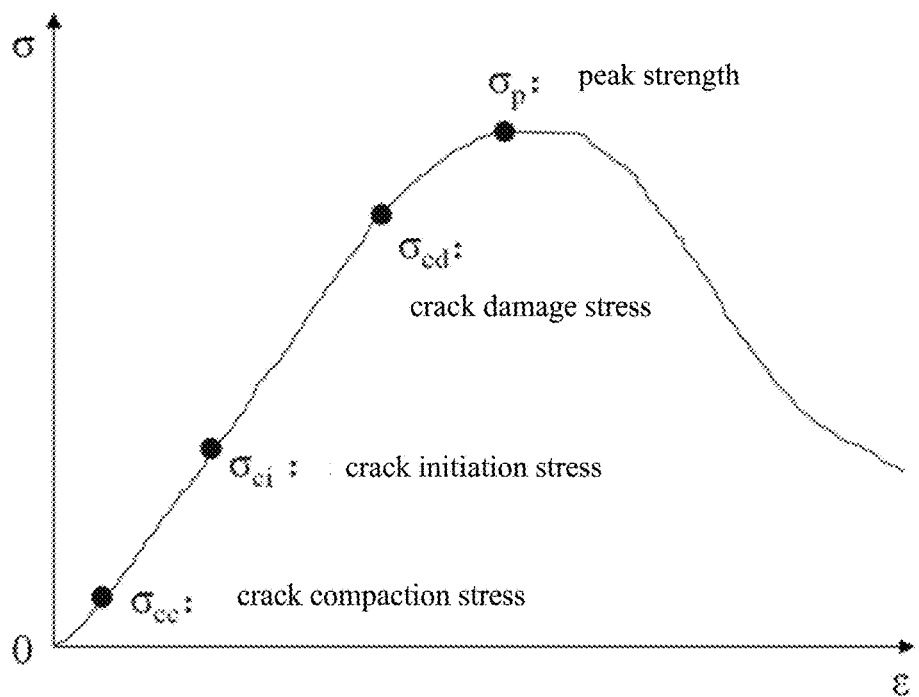
FIG. 1 illustrates a schematic view of progressive failure process of rock mass and stress thresholds corresponding thereto.

It is well known that the failure of a geological body under the action of force needs to go through a process of compaction, initiation, propagation and penetration of a crack, which correspond to a crack compaction stress ($\sigma_{cc}$), a crack initiation stress ($\sigma_{ci}$), a crack damage stress ($\sigma_{cd}$) and a peak stress ($\sigma_p$) respectively. Through statistical studies, the following relationships (1) and (2) exist among the crack initiation stress, the crack damage stress and the peak stress (peak strength), as shown in FIG. 1.

$$\sigma_{ci}=0.3{\sim}0.4\sigma_p \quad (1)$$

$$\sigma_{cd}=0.7{\sim}0.8\sigma_p \quad (2)$$

The understanding of such regularity makes it possible to quickly determine a geostress state according to the failure of rock mass in a field site. In actual slope investigations, especially in high mountains and valleys of southwest China, the phenomenon of fresh fracture of rock mass can often be seen. According to a development state of fracture, a stage of rock mass failure (such as crack initiation, crack propagation, crack penetration, etc.) can be deduced. Based on this, the stress state of the rock mass can be deduced, and then a stress field inversion method can be used to quickly analyze a large-scale geostress field, thereby providing a reference for engineering layout and disaster prevention and control.

Figure 2:
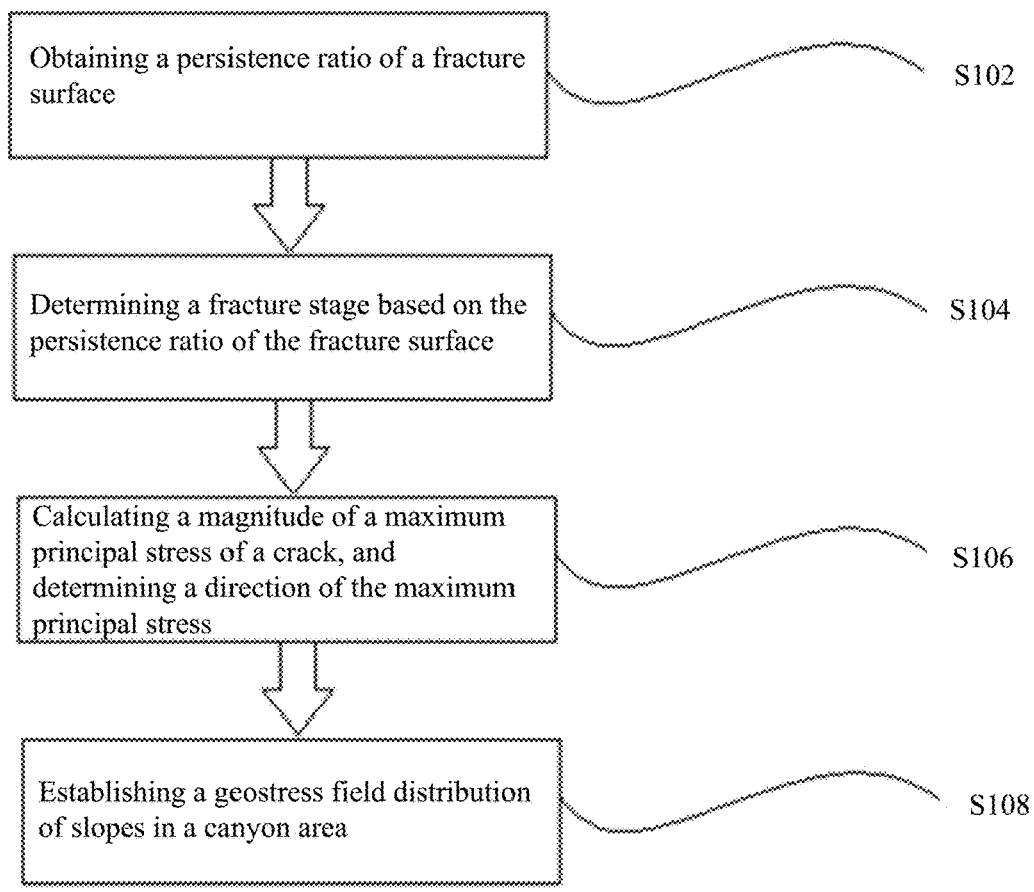
FIG. 2 illustrates a flowchart of a method for establishing a geostress field distribution of slopes in a canyon area according to an embodiment of the invention.

As illustrated in FIG. 2, a schematic flowchart of a method for establishing a geostress field distribution of slopes in a canyon area is shown. The method may include steps S102, S104, S106 and S108 as follows.

S102, obtaining, based on a structural plane trace length and a rock bridge length of a fresh fracture surface, a persistence ratio of the fracture surface. In particular, observing and recording in detail fresh fracture conditions at different positions of slopes, describing in detail propagation-penetration fractured phenomenon of the fresh fracture surface, employing a precise survey line method for structural plane measurement commonly used in engineering geological survey to measure the structural plane trace length of the fresh fracture surface with a tool such as a tape measure and measure an occurrence of structural plane with a compass, and then calculating the persistence ratio of the fracture surface through dividing the structural plane trace length $L_j$ by the sum of the rock bridge length $L_i$ and the structural plane trace length $L_j$ as per the following expression (3):

$$I = \frac{L_j}{L_i + L_j}. \quad (3)$$

S104, determining a fracture stage of a crack based on the persistence ratio of the fracture surface. In an illustrated embodiment, according to the theory of fracture mechanics of rock mass and a large number of statistical data of progressive failure of rock mass, it is preset that the persistence ratio of 0~0.2 is defined as the crack initiation stage, the persistence ratio of 0.2~0.8 is defined as the crack propagation stage, and the persistence ratio of 0.8~1 is defined as the crack damage stage.

S106, calculating a magnitude of a maximum principal stress of the crack, and determining a direction of the maximum principal stress. In an illustrated embodiment, by consulting industry reference books such as Handbook of Engineering Geology, Handbook of Rock Mechanical Properties, recommended strength values of rock mass can be given according to properties and weathering degrees of slope rocks. The strength values can also be obtained according to a uniaxial compression test. At the same time, according to the fracture stage determined in S104, the strength values are converted and calculated in different proportions, and then the magnitude of the maximum principal stress applied to a typical location is determined. In an illustrated embodiment, when the crack is in the crack initiation stage, the maximum principal stress is defined as 0.3~0.5 times of the peak strength; when the crack is in the crack propagation stage, the maximum principal stress is defined as 0.5~0.7 times of the peak strength; and when the crack is in the crack damage stage, the maximum principal stress is defined as 0.7~0.8 times of the peak strength. For example, when the persistence ratio of the fracture surface is about 0.2, the rock crack is in the initiation-propagation stage, the maximum principal stress is determined as 0.3~0.5 times of the peak strength; when persistence ratio of the fracture surface is 0.7~1, the rock crack is in the propagation-penetration fractured stage, the maximum principal stress is determined as 0.7~0.8 times of the peak strength.

Regarding the direction of the maximum principal stress: at a location of slope surface, the direction of the maximum principal stress is basically parallel to the fracture surface (or slope surface) and perpendicular to a river valley direction.

Figure 3:
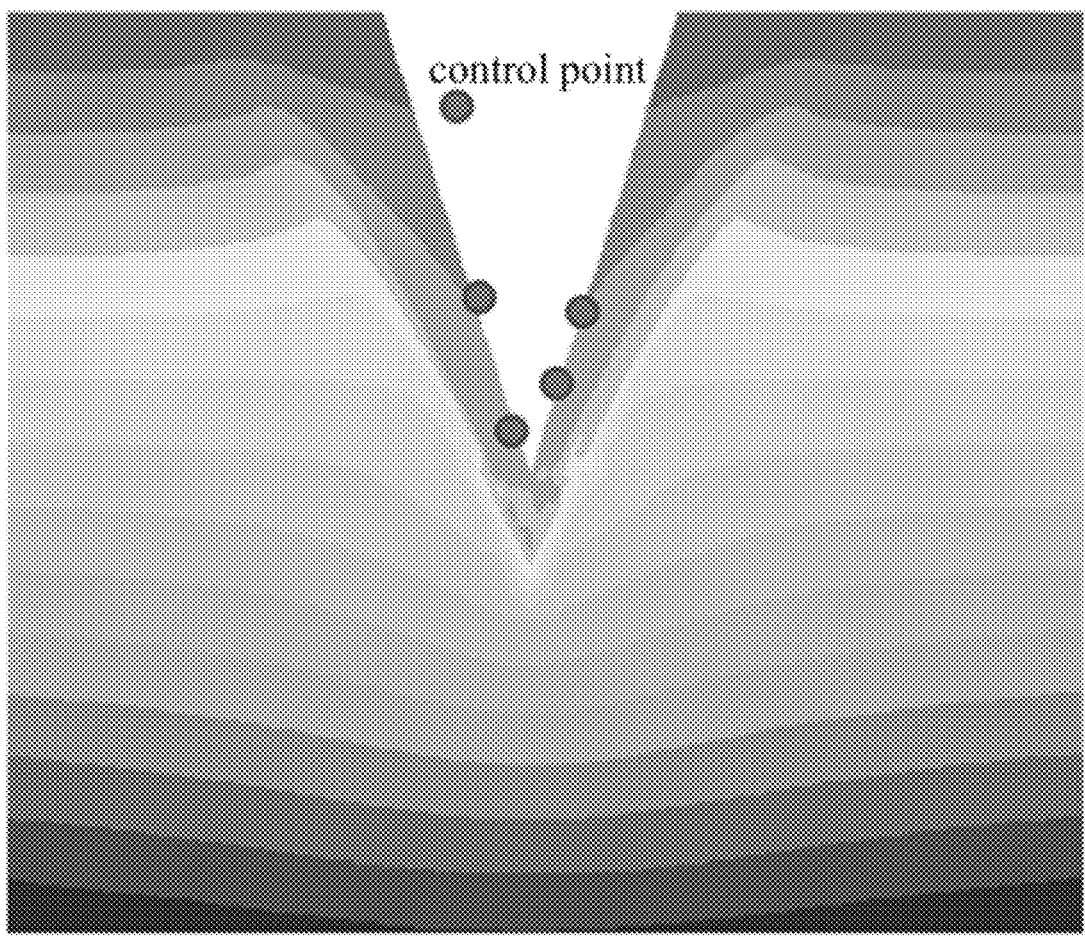
FIG. 3 illustrates a schematic view of a geostress field distribution in a canyon area obtained by the method according to the embodiment of the invention.

S108, establishing a geostress field distribution of slopes in a canyon area. In an illustrated embodiment, a numerical simulation software such as FLAC3D is used to carry out stress field inversion to the slopes in the canyon area, with the magnitude and the direction of the geostress at the above typical location as constraints, based on a multivariate linear regression principle, by changing deformation parameters of affecting the distribution of geostress such as deformation modulus of rock mass and Poisson's ratio, and independent variables such as loaded stress boundary conditions, using the least square method to carry out coefficient regression, and selecting a certain combination of independent variables to make a numerical simulation value of the geostress at the typical location under the combination most close to the predicted value, a stress field obtained by the combination of independent variables is the stress field in the canyon area, thereby obtaining the stress field distribution in the canyon area, as shown in FIG. 3.

Through the above method steps, a stress field distribution diagram of the canyon area is established simply, effectively and accurately, which provides the basis for the engineering site selection and engineering rock mass stability determination.

The above-described embodiments are only descriptions of preferred implementations of the invention, and do not limit the scope of the invention. Without departing from the spirit of the invention, various modifications and improvements made by those skilled in the art to the illustrated technical solutions of the invention should fall within the scope of protection defined in the appended set of claims.

What is claimed is:

1. A method for establishing a geostress field distribution of slopes in a canyon area, comprising:
   acquiring a structural plane trace length, a rock bridge length, an occurrence, and a character of a fracture surface, and obtaining a persistence ratio of the fracture surface based on the structural plane trace length and the rock bridge length;
   obtaining, based on a correspondence of persistence ratios of fracture surface with preset fracture stages of crack, a fracture stage of a crack corresponding to the persistence ratio of the fracture surface;
   obtaining a magnitude of a maximum principal stress of the crack based on the fracture stage and the character, and obtaining a direction of the maximum principal stress of the crack based on the occurrence;
   establishing the geostress field distribution of the slopes in the canyon area based on the magnitude of the maximum principal stress and the direction of the maximum principal stress; and
   applying the geostress field distribution of the slopes in the canyon area in engineering site selection and engineering rock mass stability determination;
   wherein the character comprises a property and a weathering degree of a rock;
   wherein obtaining the magnitude of the maximum principal stress comprises:
   obtaining a peak strength of the rock based on the property and the weathering degree of the rock; and
   obtaining the magnitude of the maximum principal stress based on the peak strength and the fracture stage.

2. The method as claimed in claim 1, wherein the structural plane trace length and the occurrence are acquired through a survey line method for structural plane measurement.

3. The method as claimed in claim 2, wherein obtaining the persistence ratio of the fracture surface comprises:
   obtaining a sum of the rock bridge length of the fracture surface and the structural plane trace length; and
   dividing the structural plane trace length by the sum of the rock bridge length and the structural plane trace length as the persistence ratio of the fracture surface.

4. The method as claimed in claim 1, wherein the direction of the maximum principal stress is parallel to the fracture surface.

5. The method as claimed in claim 1, wherein establishing the geostress field distribution of the slopes in the canyon area comprises:
   based on the magnitude of the maximum principal stress and the direction of the maximum principal stress, using a multivariate regression principle and changing independent variables of rock mass to establish a linear coefficient relationship, and then establishing the geostress field distribution of the slopes in the canyon area;
   wherein the independent variables of rock mass comprise a deformation modulus of rock mass and a geological structure variable.

6. The method as claimed in claim 5, wherein the geostress field distribution of the slopes in the canyon area is established through stress field inversion and least square coefficient regression based on the linear coefficient relationship.

* * * * *